United States Patent
Brodjonegoro et al.

(10) Patent No.: US 12,311,351 B1
(45) Date of Patent: May 27, 2025

(54) LIMESTONE SLURRY AND LIME MILK PREPARING DEVICE FOR HYDROMETALLURGY OF LATERITE NICKEL ORE

(71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Yaguang Peng, Dki Jakarta (ID); Rizky Wanaldi, Dki Jakarta (ID); Tegar Mukti Aji, Dki Jakarta (ID); Andi Syaputra Hasibuan, Dki Jakarta (ID); Evan Wahyu Kristiyanto, Dki Jakarta (ID); Arnaldo Marulitua Sinaga, Dki Jakarta (ID)

(73) Assignees: PT ESG NEW ENERGY MATERIAL, Jakarat Selatan (ID); PT QMG NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,454

(22) PCT Filed: Jun. 30, 2023

(86) PCT No.: PCT/CN2023/104638
§ 371 (c)(1),
(2) Date: Nov. 29, 2024

(87) PCT Pub. No.: WO2025/000449
PCT Pub. Date: Jan. 2, 2025

(51) Int. Cl.
*B01J 8/08* (2006.01)
*B01J 8/00* (2006.01)
(Continued)

(52) U.S. Cl.
CPC ............ *B01J 8/082* (2013.01); *B01J 8/002* (2013.01); *B01J 8/003* (2013.01); *B01J 8/085* (2013.01);
(Continued)

(58) Field of Classification Search
CPC ... B01J 8/082; B01J 8/002; B01J 8/003; B01J 8/085; B01J 8/10; B01J 2208/00548; B01J 2208/00654; B01J 2208/00752; C04B 2/08
See application file for complete search history.

(56) References Cited

FOREIGN PATENT DOCUMENTS

| CN | 204550400 U | 8/2015 |
| CN | 107413188 A | 12/2017 |

(Continued)

OTHER PUBLICATIONS

International Search Report issued in corresponding International application No. PCT/CN2023/104638, mailed Oct. 26, 2023 (7 pages).
(Continued)

*Primary Examiner* — Lessanework Seifu

(57) ABSTRACT

Disclosed is a limestone slurry and lime milk preparing device for hydrometallurgy of laterite nickel ore, comprising a limestone slurry preparation assembly and a lime milk preparation assembly. The limestone slurry preparation assembly comprises a first feeding machine, a grinding mill, a mixing machine, a first transfer pump, and a first buffer tank, connected sequentially. When the weight of the limestone slurry in the first buffer tank is not within a first preset range, the first feeding machine, grinding mill, mixing
(Continued)

machine, and first transfer pump can adjust their respective operating speeds. The lime milk preparation assembly comprises a lime kiln, a second feeding machine, a nitrifying machine, a third transfer pump, and a second buffer tank, connected sequentially. The entire production line can respond in coordination, with overall automated adjustment of production efficiency and a high level of intelligence.

11 Claims, 5 Drawing Sheets

(51) Int. Cl.
  *B01J 8/10* (2006.01)
  *C04B 2/08* (2006.01)
  *B02C 15/04* (2006.01)
  *C22B 3/00* (2006.01)
  *C22B 3/44* (2006.01)

(52) U.S. Cl.
  CPC ............... *B01J 8/10* (2013.01); *C04B 2/08* (2013.01); *B01J 2208/00548* (2013.01); *B01J 2208/00654* (2013.01); *B01J 2208/00752* (2013.01); *B02C 15/04* (2013.01); *C22B 3/44* (2013.01); *C22B 23/0461* (2013.01)

(56) References Cited

FOREIGN PATENT DOCUMENTS

| | | |
|---|---|---|
| CN | 217947987 U | 12/2022 |
| CN | 219079364 U | 5/2023 |
| JP | 2008285352 A | 11/2008 |
| KR | 101084690 B1 | 11/2011 |
| KR | 101194899 B1 | 10/2012 |

OTHER PUBLICATIONS

Written Opinion of the International Search Authority in corresponding International application No. PCT/CN2023/104638, mailed Oct. 26, 2023.

LIMESTONE SLURRY AND LIME MILK PREPARING DEVICE FOR HYDROMETALLURGY OF LATERITE NICKEL ORE

FIELD OF THE DISCLOSURE

The disclosure relates to the technical field of limestone slurry and lime milk preparation, in particular to a limestone slurry and lime milk preparing device for hydrometallurgy of laterite nickel ore.

BACKGROUND

In the current hydrometallurgical process for laterite nickel ore, the precipitation of nickel and cobalt typically involves first acid leaching of the laterite nickel ore, followed by the use of limestone slurry or lime milk as a neutralizing agent to precipitate nickel and cobalt from the acid leachate, forming a nickel-cobalt precipitate solution. In existing technologies, there are various types of equipment used for preparing limestone slurry or lime milk.

For instance, a Chinese patent with publication number CN102674714A provides a lime milk preparation device that comprises a feeding unit, a nitration unit, a dissolution unit, a dust collection unit, a dust removal unit, and a recovery unit. The preparation of lime milk is accomplished through the coordinated operation of these units.

However, there are still some shortcomings in this existing technology. For example, the preparation device does not incorporate any automatic control structure, making it unable to automatically control the preparation of lime milk. Additionally, the device lacks intelligence during its operation process.

SUMMARY

The purpose of this disclosure is to provide a limestone slurry and lime milk preparing device for hydrometallurgy of laterite nickel ore to solve the technical problem that lime milk preparation devices lack any automatic control structure, are unable to automatically control the preparation of lime milk, and are not intelligent enough during operation.

In order to solve the above technical problems, this disclosure provides a limestone slurry and lime milk preparing device for hydrometallurgy of laterite nickel ore, comprising a limestone slurry preparation assembly and a lime milk preparation assembly, wherein:

the limestone slurry preparation assembly comprises a first feeding machine, a grinding mill, a mixing machine, a first transfer pump, and a first buffer tank, which are connected in sequence; the first feeding machine is equipped with a first controller, the grinding mill is equipped with a second controller, the mixing machine is equipped with a third controller, the first transfer pump is equipped with a fourth controller, and the first buffer tank is equipped with a fifth controller; the fifth controller is simultaneously connected to the first controller, the second controller, the third controller, and the fourth controller; the fifth controller is capable of emitting a first sensing signal and transmitting it to the first controller, the second controller, the third controller, and the fourth controller when the weight of the limestone slurry in the first buffer tank is not within a first preset range; the first controller can adjust the feeding rate of the limestone raw material by the first feeding machine based on the first sensing signal; the second controller can control the grinding speed of the grinding mill in response to the first sensing signal; the third controller can regulate the mixing speed of the mixing machine according to the first sensing signal; the fourth controller can modify the pumping speed of the first transfer pump for conveying the limestone slurry based on the first sensing signal;

the lime milk preparation assembly comprises a lime kiln, a second conveyor, a third elevator, a lime storage bin, a second feeding machine, a nitrifying machine, a slag extractor, a third transfer pump, and a second buffer tank that are connected sequentially, the lime kiln is used for preparing quicklime, which is then conveyed to the second conveyor; the second feeding machine is equipped with a sixth controller, the nitrifying machine is equipped with a seventh controller, the third transfer pump is equipped with an eighth controller, and the second buffer tank is equipped with a ninth controller; the ninth controller is simultaneously connected to the sixth controller, the seventh controller, and the eighth controller; the ninth controller can send a second sensing signal when the weight of the lime milk in the second buffer tank is not within a second preset range, and transmit it to the sixth controller, the seventh controller, and the eighth controller simultaneously; the sixth controller can control the feeding rate of quicklime raw material from the second feeding machine based on the second sensing signal, the seventh controller can control the mixing rate of quicklime and water in the nitrifying machine based on the second sensing signal, and the eighth controller can control the transfer rate of lime milk by the third transfer pump based on the second sensing signal.

Furthermore, the first feeding machine comprises a first machine body and a first hopper that are slidingly connected; the first hopper is designed to slide up and down relative to the first machine body to convey limestone raw material into the grinding mill; the first hopper is connected to the first controller, which can adjust the speed of the first hopper's vertical movement relative to the first machine body based on the first sensing signal, thereby regulating the rate of limestone raw material supplied by the first feeding machine to the grinding mill.

Furthermore, the grinding mill comprises a grinding mill motor, a grinding disk, grinding rollers, a hydraulic pressing device, a pneumatic conveying channel, and a powder selecting machine; the number of the grinding rollers is 2-4; the grinding rollers are evenly arranged around the center of the grinding disk; the hydraulic pressing device is connected to the multiple grinding rollers, functioning to press the limestone material between the grinding disk and the grinding rollers; the grinding mill motor is connected to the grinding disk and can drive the grinding disk to rotate relative to the grinding rollers, thereby grinding the limestone material into limestone powder; the powder selecting machine and the limestone material are located at the air inlet and outlet of the pneumatic conveying channel, respectively; the pneumatic conveying channel is used to blow out the limestone powder, while the powder selecting machine allows limestone powder of a preset particle size to pass through.

Furthermore, the mixing machine comprises a third machine body, a mixing motor and a mixing rod installed in the third machine body; the mixing motor is connected to the mixing rod and can drive it to rotate, thereby mixing limestone powder and water; the mixing motor is connected to a third controller, which can control the rotational speed of the mixing motor based on the first sensing signal, thus adjusting the mixing speed of the mixing machine.

Furthermore, the limestone slurry preparation assembly also comprises a first conveyor and a first elevator; the first feeding machine, the first conveyor, the first elevator, and the grinding mill are connected in sequence; the first conveyor is used to transport the limestone supplied by the first feeding machine to the first elevator; the first elevator is used to transfer the limestone supplied by the first feeding machine to the grinding mill, enabling the grinding mill to grind the limestone into powder.

Furthermore, the second feeding machine comprises a fourth machine body and a second hopper that are slidingly connected; the second hopper is used to slide up and down relative to the fourth machine body in order to deliver quicklime raw material into the nitrifying machine; the second hopper is connected to a sixth controller, which can adjust the speed of the second hopper's vertical sliding motion relative to the fourth machine body based on the second sensing signal, thus regulating the rate of quicklime raw material supplied by the second feeding machine to the nitrifying machine.

Furthermore, the nitrifying machine comprises a fifth machine body, as well as a digestion motor and a digestion rod installed on the fifth machine body; the digestion motor is connected to the digestion rod and can drive it to rotate, thereby mixing quicklime and water; the digestion motor is connected to a seventh controller, which can control the rotational speed of the digestion motor based on the second sensing signal, thus adjusting the mixing speed of the quicklime and water within the nitrifying machine.

Furthermore, the limestone slurry preparation assembly further comprises a limestone powder storage tank and a rotor scale; the limestone powder storage tank is positioned between the second elevator and the rotor scale; the limestone powder storage tank is used to receive the limestone powder conveyed by the second elevator, while the rotor scale is used to weigh the contents of the limestone powder storage tank.

Furthermore, the lime milk preparation assembly also comprises a slag extractor positioned between the nitrifying machine and the third transfer pump; the slag extractor is used to extract impurities from the nitrifying machine.

Furthermore, the slag extractor is equipped with a tenth controller, which is connected to the ninth controller; the tenth controller can adjust the speed of impurity extraction by the slag extractor based on the second sensing signal.

Furthermore, the slag extractor consists of a connected slag extraction motor and propeller; part of the propeller is submerged in the solution contained within the nitrifying machine; when driven by the slag extraction motor, the propeller rotates to expel impurities from the solution; the slag extraction motor is connected to the tenth controller, which can regulate the rotational speed of the slag extraction motor based on the second sensing signal, thus adjusting the speed at which the propeller expels impurities.

Compared with existing technologies, the beneficial effects of this disclosure are: the disclosure has a limestone slurry preparation assembly that can be used to prepare limestone slurry, and a lime milk preparation assembly that can be used to prepare lime milk, During the process of preparing limestone slurry using the limestone slurry preparation assembly, if the amount of limestone slurry collected in the first buffer tank does not reach a preset value, a fourth controller generates a first sensing signal and simultaneously transmits it to the first controller, second controller, and third controller. Consequently, the first feeding machine automatically adjusts the speed of supplying limestone raw materials, the grinding mill automatically adjusts its grinding speed, and the mixing machine automatically adjusts its mixing speed, until the amount of limestone slurry collected in the first buffer tank reaches the preset value. The entire production line is capable of coordinated response, with overall automated adjustment of production efficiency and a high level of intelligence.

During the process of preparing lime milk using the lime milk preparation assembly, if the amount of lime milk collected in the second buffer tank does not reach a preset value, a ninth controller generates a second sensing signal and simultaneously transmits it to the sixth controller, seventh controller, and eighth controller. Consequently, the second feeding machine automatically adjusts the speed of supplying quicklime raw materials, the nitrifying machine automatically adjusts the mixing speed of quicklime and water, and the third transfer pump automatically adjusts the speed of transporting lime milk, until the amount of lime milk collected in the second buffer tank reaches the preset value. The entire production line is capable of coordinated response, with overall automated adjustment of production efficiency and a high level of intelligence.

DETAILED DESCRIPTION OF PREFERRED EMBODIMENTS

The preferred embodiment of this disclosure will be described in detail below in conjunction with the accompanying drawings, which form a part of this disclosure and are used together with the embodiments of this disclosure to explain the principle of this disclosure, and are not intended to limit the scope of this disclosure.

This disclosure provides a limestone slurry and lime milk preparation device for hydrometallurgy of laterite nickel ore. The preparation device comprises a limestone slurry preparation assembly and a lime milk preparation assembly. The limestone slurry preparation assembly can be used to prepare limestone slurry, while the lime milk preparation assembly can be used to prepare lime milk. During the process of preparing limestone slurry using the limestone slurry preparation assembly and during the process of preparing lime milk using the lime milk preparation assembly, automatic control of the entire production line can be achieved. The entire production line is capable of coordinated response, with overall automated adjustment of production efficiency and a high level of intelligence.

Figure 1:
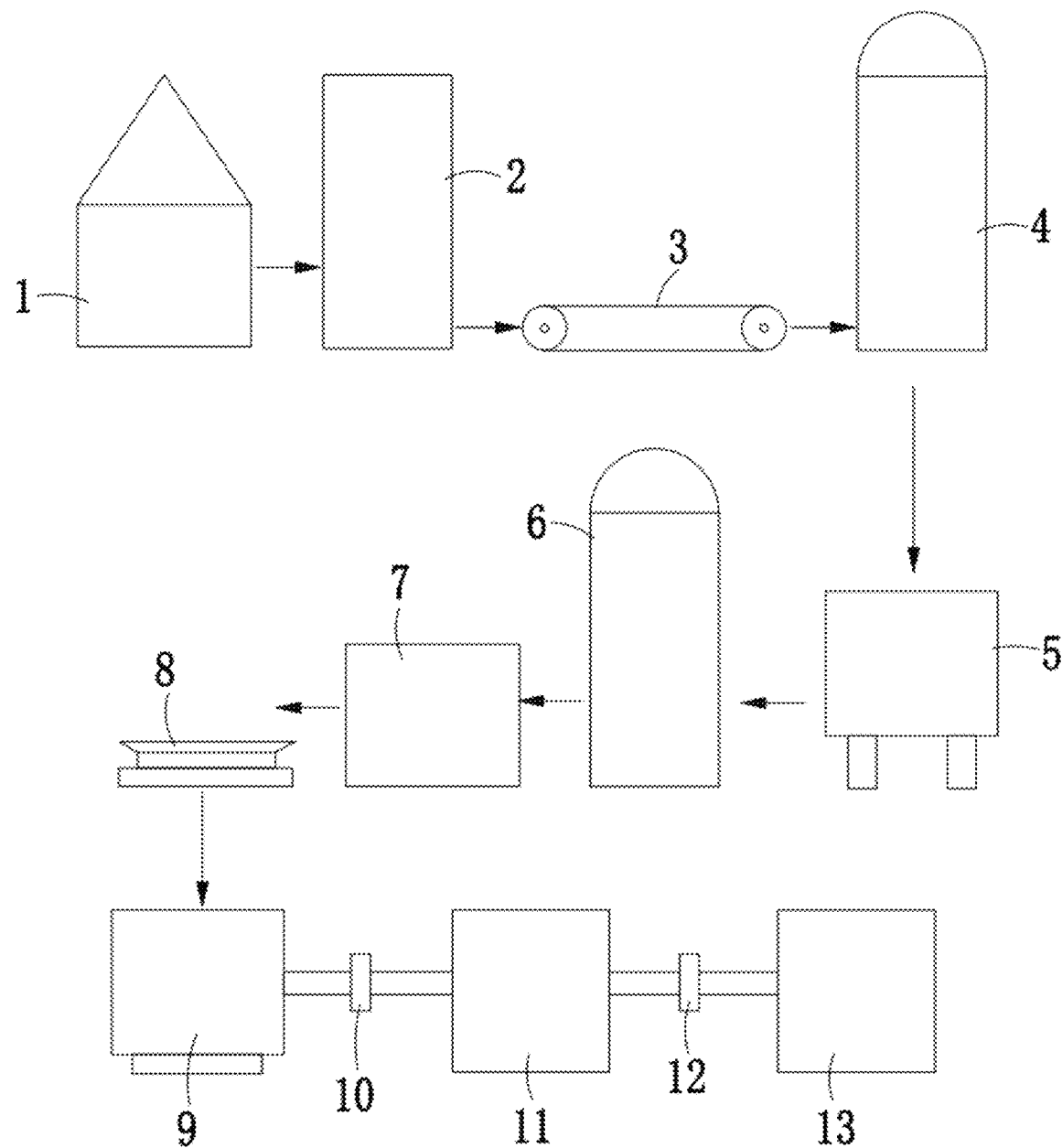
FIG. 1 is a structural diagram of the limestone slurry preparation assembly in this disclosure.

Please refer to FIG. 1, the limestone slurry preparation assembly comprises a limestone feeding bin 1, a first feeding machine 2, a first conveyor 3, a first elevator 4, a grinding mill 5, a second elevator 6, a rotor scale 8, a mixing machine 9, a first transfer pump 10, a limestone slurry storage tank 11, a second transfer pump 12, and a first buffer tank 13, which are connected in sequence. The first feeding machine 2 is equipped with a first controller.

The limestone feeding bin 1 has a certain storage space and can be used to store a certain amount of limestone raw material. The limestone raw material is in a block form, which facilitates handling. The limestone feeding bin 1 also has a handling manipulator, which is used to transport the limestone raw material to the first feeding machine 2.

The first feeding machine 2 has a certain storage space and can be used to store a certain amount of limestone raw material. The first feeding machine 2 comprises a first main control board, a first machine body, a first material tray, a first weighing instrument, and a first hopper. Among them, the first material tray is installed on the first weighing instrument, and the first machine body has a storage space for storing limestone raw material. The first hopper is slidably installed on the first machine body and is used to slide up and down relative to the first machine body to grab the limestone raw material inside the first machine body and place it on the first material tray. The first main control board is wirelessly connected to the first weighing instrument and is connected to the first hopper. When the weight measured by the first weighing instrument exceeds a preset value, the first main control board controls the first hopper to grab the first material tray and pour the limestone raw material on the first material tray onto the first conveyor 3.

Through the weighing of the first weighing instrument, the weight of quicklime placed on the first conveyor 3 by the first feeding machine 2 per unit of time is basically the same.

The first conveyor 3 is driven by a motor connected to it, and the two ends of the first conveyor 3 are respectively positioned close to the first feeding machine 2 and the first elevator 4, The first conveyor 3 can convey the limestone raw material to the position of the first elevator 4.

The first elevator 4 is used to pick up the limestone raw material conveyed by the first conveyor 3 and transfer it to the grinding mill 5. Specifically, the first elevator 4 comprises a body and a loading tray that slides on the body. The loading tray is initially connected to the end of the first conveyor 3, allowing the limestone raw material on the first conveyor 3 to directly fall onto the loading tray. The loading tray can automatically measure the weight of the loaded limestone raw material, and it has a second main control board. When the weight of the loading tray exceeds a first preset weight, the second main control board automatically controls the loading tray to slide relative to the body, pouring the limestone raw material in the loading tray into the grinding mill 5.

Figure 3:
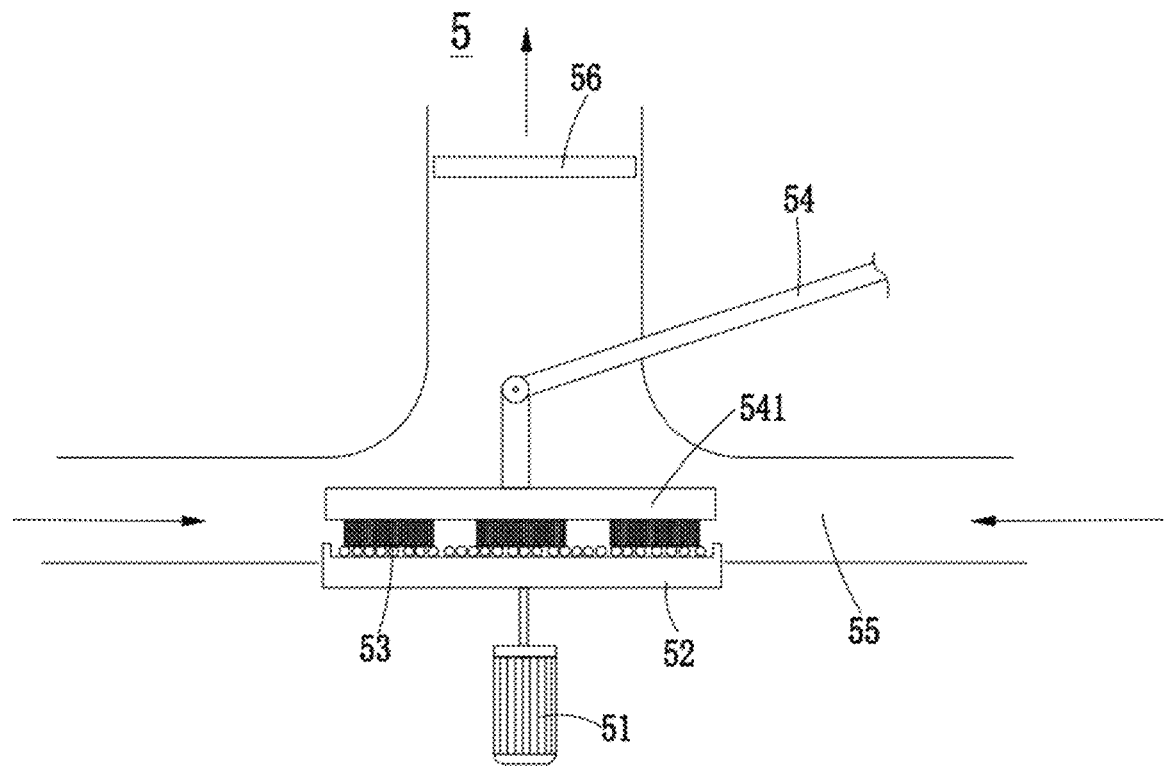
FIG. 3 is a structural diagram of the grinding mill in this disclosure.

Please refer to FIG. 3, the grinding mill 5 comprises a grinding mill motor 51, a grinding disk 52, grinding rollers 53, a hydraulic pressing device 54, a pneumatic conveying channel 55, and a powder selecting machine 56. Among them, the number of grinding rollers 53 can be multiple, such as 2-4 or more than four. The multiple grinding rollers 53 are evenly arranged around the center of the grinding disk 52, so that the multiple grinding rollers 53 can contact as much limestone raw material as possible, thereby improving grinding efficiency.

The hydraulic pressing device 54 can be understood as a lever structure that has a pressing plate 541. The pressing plate 541 connects multiple grinding rollers 53 simultaneously. Under the action of the hydraulic pressing device 54, the pressing plate 541 can simultaneously apply force to multiple grinding rollers 53, causing them to press tightly against the limestone raw material between the grinding disk 52 and the grinding rollers 53. The grinding mill motor 51 is connected to the grinding disk 52 and can drive the grinding disk 52 to rotate relative to the grinding rollers 53, grinding the limestone raw material into limestone powder.

The powder selecting machine 56 and the limestone raw material are located at the air inlet and air outlet of the pneumatic conveying channel 55, respectively. The air inlet of the pneumatic conveying channel 55 has a blower, which is used to blow air into the pneumatic conveying channel 55 to blow the ground limestone powder towards the air outlet of the pneumatic conveying channel 55.

Figure 4:
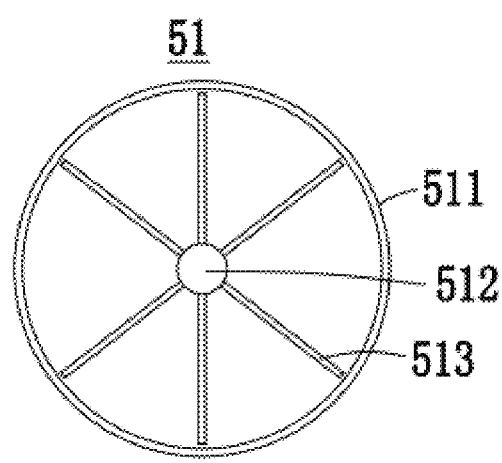
FIG. 4 is a top view of the powder selecting machine in this disclosure.
Figure 5:
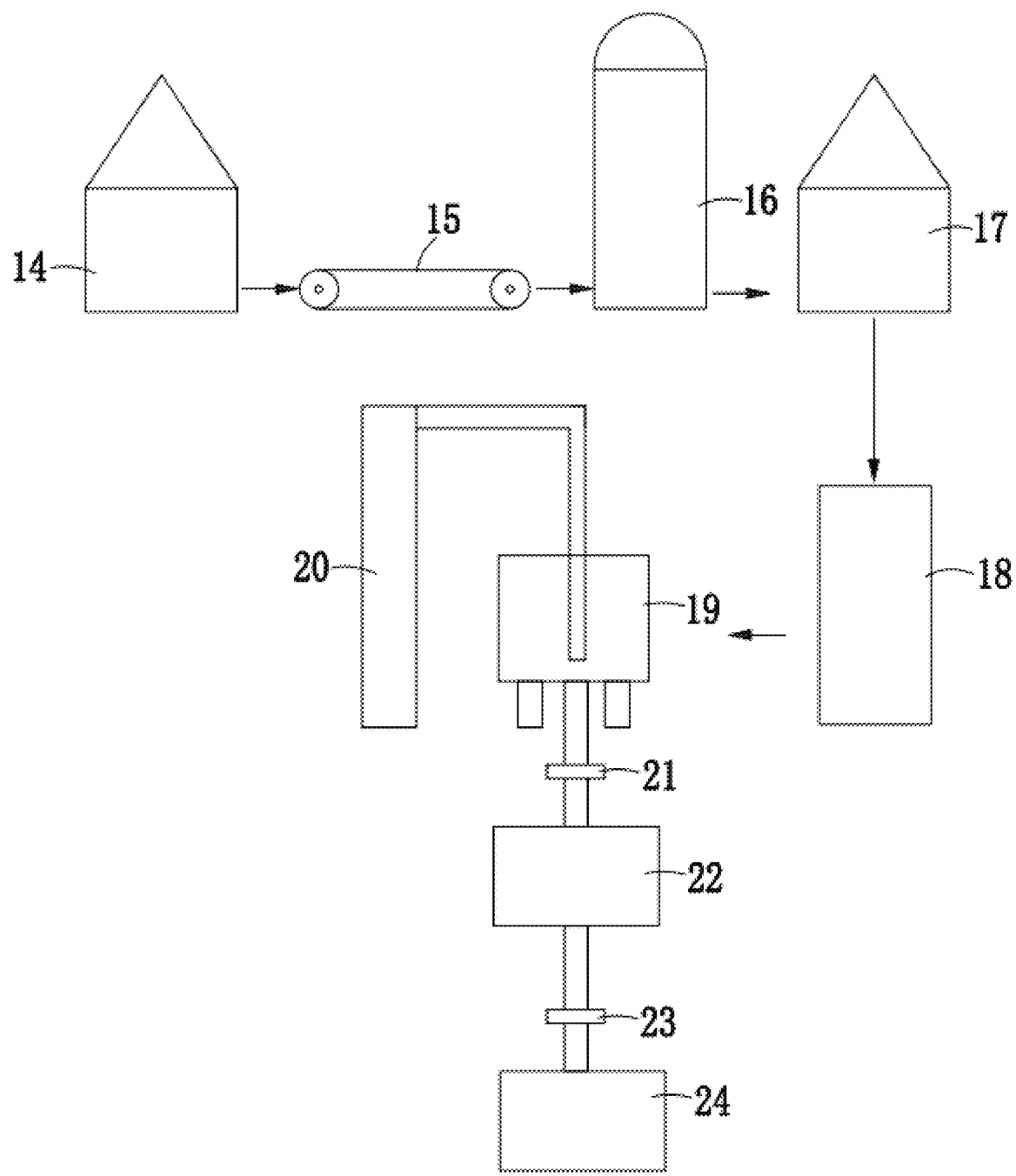
FIG. 5 is a structural diagram of the lime milk preparation assembly in this disclosure.

Please refer to FIG. 4, the powder selecting machine 56 comprises a support frame 511, an impeller 512, and a powder selecting motor. The support frame 511 and the impeller 512 are rotatably connected, and the powder selecting motor is connected to the impeller 512, driving it to rotate relative to the support frame 511. The rotational plane of the impeller 512 is perpendicular to the air outlet direction of the pneumatic conveying channel 55, and the limestone powder arrives at the impeller 512 under the action of wind force. The impeller 512 has multiple blades 513 arranged circumferentially with spaces between adjacent blades. During the rotation of the impeller 512, it allows limestone powder with a particle size smaller than a preset particle size to pass through, so that the limestone powder with a particle size smaller than the preset particle size can pass through the impeller 512 and enter the subsequent process. The limestone powder with larger particle sizes that do not meet the preset particle size will be hit down by the blades 513 of the impeller 512 and fall onto the grinding disk 52 for continued grinding until it is ground into limestone powder of the preset particle size that can pass through the impeller 512.

Between the grinding mill 5 and the second elevator 6, a chute fan can be installed. The chute fan is used to blow and disperse the falling limestone powder before it lands on the second elevator 6. This ensures that the limestone powder accumulated on the second elevator 6 is in a fluffy state, preventing accumulation that might affect subsequent processing.

The structure of the second elevator 6 is consistent with the structure of the first elevator 4. The second elevator 6 is used to transfer the limestone powder to the rotor scale 8.

Near the rotor scale 8, a Roots blower can also be installed. The Roots blower can blow away any excess limestone powder in the vicinity of the rotor scale 8, preventing it from affecting the weighing accuracy of the rotor scale 8.

The rotor scale 8 is used for weighing the limestone powder that has been transferred. When the weight reaches a second preset weight, the limestone powder on the rotor scale 8 can be manually dumped into the mixing machine 9.

The mixing machine 9 comprises a third machine body, a mixing motor and a mixing rod installed in the third machine body; the mixing motor is connected to the mixing rod and can drive it to rotate, thereby mixing the limestone powder and water to form a preliminary limestone slurry. The third machine body features a mixing tank for accommodating the limestone powder and water. The mixing tank is connected to a water pipe that can deliver a measured amount of water into the tank to mix with the limestone powder.

The first transfer pump 10 is connected to the mixing tank. After the limestone powder and water in the mixing tank have been thoroughly mixed to form a limestone slurry, the first transfer pump 10 begins to operate, pumping the limestone slurry into the limestone slurry storage tank 11 for temporary storage.

On the other side of the limestone slurry storage tank 11, it is connected to a second transfer pump 12, The second transfer pump 12 is capable of pumping the limestone slurry once again into a first buffer tank 13 for storage, where the limestone slurry is obtained and ready for direct use in the hydrometallurgy of laterite nickel ore.

The first feeding machine 2 is equipped with a first controller, the grinding mill 5 is equipped with a second controller, the mixing machine 9 is equipped with a third controller, the first transfer pump 10 is equipped with a fourth controller, and the first buffer tank 13 is equipped with a fifth controller. The fifth controller is connected to the first controller, the second controller, the third controller, and the fourth controller simultaneously. The fifth controller is capable of emitting a first sensing signal and transmitting it to the first controller, the second controller, the third controller, and the fourth controller when the weight of the limestone slurry in the first buffer tank 13 is not within a first preset range. The first controller can adjust the feeding rate of the limestone raw material by the first feeding machine 2 based on the first sensing signal. The second controller can control the grinding speed of the grinding mill 5 in response to the first sensing signal. The third controller can regulate the mixing speed of the mixing machine 9 according to the first sensing signal. The fourth controller can modify the pumping speed of the first transfer pump 10 for conveying the limestone slurry based on the first sensing signal.

When the weight of the limestone slurry in the first buffer tank 13 is less than the first preset range, the fifth controller automatically controls the first controller, the second controller, the third controller, and the fourth controller to increase the operating speeds of their respective components, thereby enhancing production capacity. Conversely, when the weight of the limestone slurry in the first buffer tank 13 exceeds the first preset range, the fifth controller reduces the operating speeds of the respective components, thereby decreasing production capacity. Ultimately, this helps to balance production capacity and facilitates stable production.

The first sensing signal comprises a first signal and a second signal. When the weight of the limestone slurry in the first buffer tank 13 is less than the first preset range, the fifth controller generates the first signal and transmits it to the first controller, the second controller, the third controller, and the fourth controller, causing each controller to increase the operating speed of its respective component, thereby enhancing production capacity.

When the weight of the limestone slurry in the first buffer tank 13 exceeds the first preset range, the fifth controller generates a second signal and transmits it to the first controller, the second controller, the third controller, causing each controller to decrease the operating speed of its respective component, thereby reducing production capacity.

The phrase "the first controller can control the feeding speed of the first feeding machine 2 based on the first sensing signal" can be understood as:

The first hopper is connected to the first controller, which can adjust the speed of the first hopper's vertical sliding movement relative to the first machine body based on the first sensing signal. This adjustment, in turn, controls the feeding speed of limestone raw material supplied by the first feeding machine 2 to the grinding mill 5.

The phrase "the second controller can control the grinding speed of the grinding mill 5 based on the first sensing signal" can be understood as:

The grinding mill motor is connected to the second controller, which can adjust the speed at which the grinding mill motor drives the crushing block to move up and down based on the first sensing signal. This adjustment, in turn, controls the speed of crushing the limestone raw material. The faster the grinding mill motor moves the crushing platen up and down, the quicker the limestone raw material is crushed; conversely, the slower the movement, the slower the crushing speed.

The phrase "the third controller can control the mixing speed of the mixing machine 9 based on the first sensing signal" can be understood as:

The mixing motor of the mixing machine 9 is connected to the third controller, which can adjust the rotational speed of the mixing rod driven by the mixing motor based on the first sensing signal. This adjustment, in turn, controls the mixing speed of the mixing machine 9, The faster the mixing motor spins the mixing rod, the quicker the mixing speed of the mixing machine 9; conversely, the slower the rotational speed, the slower the mixing process.

The phrase "the fourth controller can control the speed of the first transfer pump 10 for conveying limestone slurry based on the first sensing signal" can be understood as:

The first transfer pump 10 is connected to the mixing tank of the mixing machine 9 through a water pipe. The mixing tank contains limestone slurry. Based on the first sensing signal, the first transfer pump 10 can automatically control the speed of pumping or suctioning the limestone slurry.

Please refer to FIG. 3, the lime milk preparation assembly comprises a lime kiln 14, a second conveyor 15, a third elevator 16, a lime storage bin 17, a second feeding machine 18, a nitrifying machine 19, a slag extractor 20, a third transfer pump 21, and a second buffer tank 24 that are connected sequentially, specifically: the lime kiln 14 is used for burning and preparing quicklime, which is then conveyed to the second conveyor 15. The second conveyor 15 then transports the quicklime to the third elevator 16. The third elevator 16 then transfers the quicklime to the second feeding machine 18. The second feeding machine 18 quantitatively supplies the quicklime to the nitrifying machine 19, where it reacts with water to form a preliminary lime milk. After removing excess impurities through the slag extractor 20, the lime milk is conveyed by the third transfer pump 21 to the second buffer tank 24 for storage.

The lime kiln 14 comprises a firing chamber and an extraction chamber. The firing chamber is used for burning limestone to produce quicklime. The extraction chamber is equipped with a robotic arm, which is utilized to transfer the burnt quicklime onto the second conveyor 15.

The second conveyor 15 is used to transport the quicklime to a location near the third elevator 16.

The structure of the third elevator 16 is identical to that of the first elevator 4, and thus, no additional description is necessary here. The third elevator 16 is used to transfer the quicklime to the lime storage bin 17 for temporary storage. The lime storage bin 17 is also equipped with a robotic arm, which is used to pick up the quicklime inside the lime storage bin 17 and transfer it to the second feeding machine 18.

The second feeding machine 18 comprises a fourth machine body and a second hopper that are connected in a sliding manner. The second hopper is designed to slide up and down relative to the fourth machine body, allowing it to deliver quicklime into the nitrifying machine 19.

The second feeding machine 18 comprises a second main control board, a fourth machine body, a second material tray, a second weighing instrument, and a second hopper. The second material tray is installed on the second weighing instrument, and the second hopper is connected to the second main control board. The fourth machine body has a storage space for storing quicklime. The second hopper is slidably mounted on the fourth machine body and is used to move up and down relative to the fourth machine body to pick up quicklime from within the fourth machine body and place it onto the second material tray. The second main control board is wirelessly connected to the second weighing instrument. When the weight measured by the second weighing instrument exceeds a third preset weight, the second main control board controls the second hopper to grasp the second material tray and pour the quicklime on it into the nitrifying machine 19.

The nitrifying machine 19 comprises a fifth machine body, as well as a digestion motor and a digestion rod installed on the fifth machine body. The digestion motor is connected to the digestion rod and can drive it to rotate, stirring and mixing the quicklime and water to form a preliminary lime milk.

The slag extractor 20 consists of a slag extraction motor and a propeller that are interconnected. A portion of the propeller is submerged in the lime milk solution contained within the nitrifying machine 19. When powered by the slag extraction motor, the propeller rotates, utilizing its blades to remove impurities from the lime milk solution and direct them outside.

A slag conveyor can also be installed near the slag extractor 20. The impurities removed by the propeller can directly fall onto the slag conveyor, which then transports the impurities to a waste recycling bin.

The slag extractor 20 also features an intermediate tank, which is controlled by a control valve for opening and closing. After the impurities have been removed, the control valve can be opened to allow the lime milk to flow into the intermediate tank.

One end of the third transfer pump 21 is connected to the intermediate tank through a pipe, while the other end of the third transfer pump 21 is connected to a storage tank 22, which has a lime milk storage tank. The third transfer pump 21 is capable of pumping the lime milk into the lime milk storage tank for temporary storage.

The storage tank is connected to a second buffer tank 24 through a lime milk transfer pump 23. By pumping the lime milk, the lime milk can be transferred to the second buffer tank 24 to obtain lime milk that can be directly used for the hydrometallurgical processing of laterite nickel ore.

The second feeding machine 18 is equipped with a sixth controller, the nitrifying machine 19 is equipped with a seventh controller, the third transfer pump 21 is equipped with an eighth controller, and the second buffer tank 24 is equipped with a ninth controller. The ninth controller is simultaneously connected to the sixth controller, the seventh controller, and the eighth controller. The ninth controller can send a second sensing signal when the weight of the lime milk in the second buffer tank 24 is not within a second preset range, and transmit it to the sixth controller, the seventh controller, and the eighth controller simultaneously. The sixth controller can control the feeding rate of quicklime raw material from the second feeding machine 18 based on the second sensing signal, the seventh controller can control the mixing rate of quicklime and water in the nitrifying machine 19 based on the second sensing signal, and the eighth controller can control the transfer rate of lime milk by the third transfer pump 21 based on the second sensing signal.

When the weight of the lime milk in the second buffer tank 24 is less than the second preset range, the ninth controller automatically controls the sixth controller, the seventh controller, and the eighth controller to increase the operating speeds of their respective components, thereby enhancing production capacity. Conversely, when the weight of the lime milk in the second buffer tank 24 is greater than the second preset range, the ninth controller controls the respective component to decrease its operating speed, thereby reducing production capacity, ultimately balancing the production capacity and contributing to stable production.

The second sensing signal comprises a third signal and a fourth signal. When the weight of the lime milk in the second buffer tank 24 is less than the second preset range, the ninth controller generates the third signal and transmits it to the sixth controller, the seventh controller, and the eighth controller, causing each controller to increase the operating speed of its respective component, thereby enhancing production capacity.

When the weight of the lime milk in the second buffer tank 24 is greater than the second preset range, the ninth controller generates a fourth signal and transmits it to the sixth controller, the seventh controller, and the eighth controller, causing each controller to decrease the operating speeds of their respective components, thereby reducing production capacity.

The phrase "the sixth controller can control the feeding rate of quicklime raw material from the second feeding machine 18 based on the second sensing signal" can be understood as:

The second main control board is connected to the sixth controller, which can control the second main control board based on the second sensing signal. The second main control board, in turn, controls the speed of the second hopper sliding up and down relative to the fourth machine body. This adjustment affects the feeding rate of quicklime raw material from the second feeding machine 18 to the nitrifying machine 19. When the speed of the second hopper sliding up and down increases, the feeding rate of quicklime raw material from the second feeding machine 18 to the nitrifying machine 19 also increases, resulting in higher work efficiency, Conversely, if the sliding speed decreases, the feeding rate slows down, leading to lower work efficiency.

The phrase "the seventh controller can adjust the mixing speed of quicklime and water in the nitrifying machine 19 based on the second sensing signal" can be understood as:

The digestion motor is connected to the seventh controller, which can regulate the rotational speed of the digestion rod driven by the digestion motor based on the second sensing signal. This adjustment in turn controls the mixing speed of quicklime and water in the nitrifying machine 19. The faster the rotational speed of the digestion rod, the quicker the mixing process in the nitrifying machine, resulting in a faster production rate of lime milk. Conversely, a slower rotational speed leads to a slower mixing process and lime milk production.

The eighth controller can regulate the speed of the third transfer pump 21 in conveying lime milk based on the second sensing signal. This means that the third transfer pump 21 can automatically adjust its operating speed according to the eighth controller. The faster the operating speed, the quicker the suction and conveying rate of lime milk. Conversely, a slower operating speed leads to a slower suction and conveying rate of lime milk.

The slag extractor 20 is equipped with a tenth controller, which is connected to the ninth controller. The tenth controller can regulate the speed of the slag extractor 20 in removing impurities based on the second sensing signal.

The slag extraction motor is connected to the tenth controller, which can adjust the rotational speed of the propeller driven by the slag extraction motor based on the second sensing signal. This adjustment in turn controls the speed of the propeller in exporting impurities.

This disclosure also provides a process for preparing limestone slurry and lime milk for hydrometallurgy of laterite nickel ore, comprising a process for preparing limestone slurry and a process for preparing lime milk.

Figure 2:
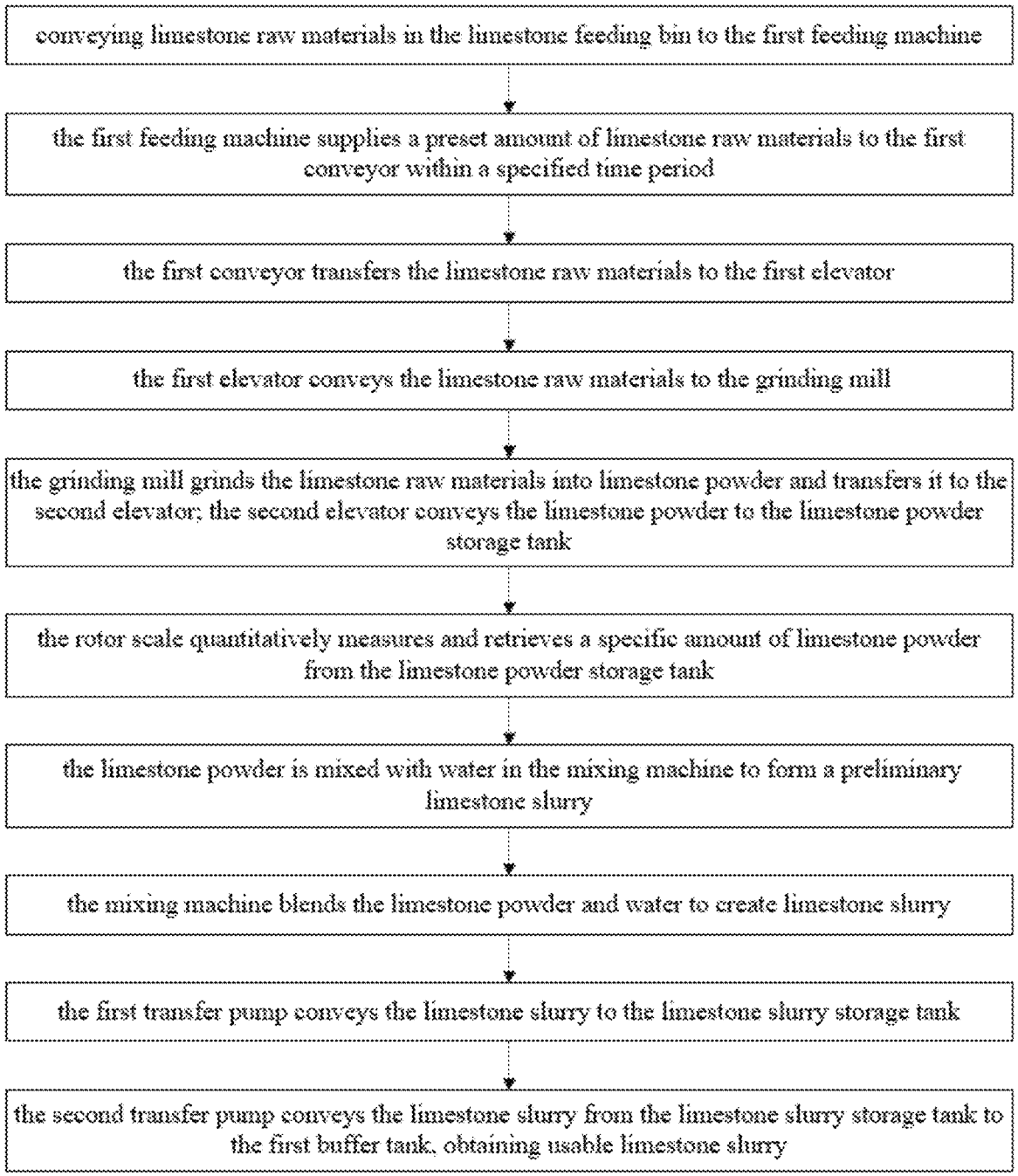
FIG. 2 is a flow diagram illustrating the operation of the limestone slurry preparation assembly in this disclosure.

Please refer to FIG. 2, the process for preparing limestone slurry includes the following steps: conveying limestone raw materials in the limestone feeding bin 1 to the first feeding machine 2; the first feeding machine 2 supplies a preset amount of limestone raw materials to the first conveyor 3 within a specified time period; the first conveyor 3 transfers the limestone raw materials to the first elevator 4; the first elevator 4 conveys the limestone raw materials to the grinding mill 5; the grinding mill 5 grinds the limestone raw materials into limestone powder and transfers it to the second elevator 6; the second elevator 6 conveys the limestone powder to the limestone powder storage tank 7; the rotor scale 8 quantitatively measures and retrieves a specific amount of limestone powder from the limestone powder storage tank 7; the limestone powder is mixed with water in the mixing machine 9 to form a preliminary limestone slurry; the mixing machine 9 blends the limestone powder and water to create limestone slurry; the first transfer pump 10 conveys the limestone slurry to the limestone slurry storage tank 11; the second transfer pump 12 conveys the limestone slurry from the limestone slurry storage tank 11 to the first buffer tank 13, obtaining usable limestone slurry.

Figure 6:
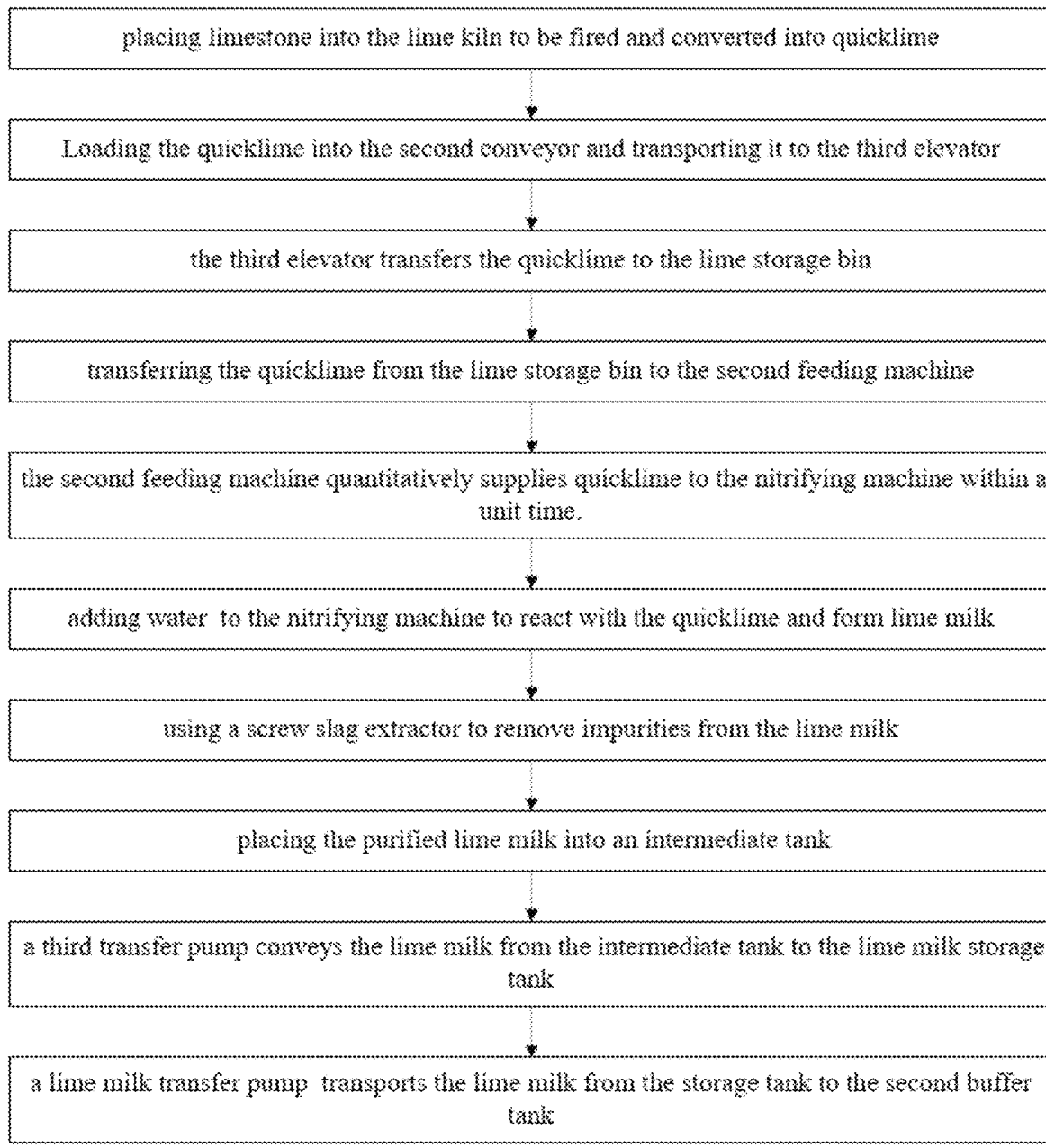
FIG. 6 is a flow diagram illustrating the operation of the lime milk preparation assembly in this disclosure.

Please refer to FIG. 6, the process for preparing lime milk includes the following steps: placing limestone in the lime kiln 14 to be fired and converted into quicklime. Then loading the quicklime onto the second conveyor 15, the second conveyor 15 then transport the quicklime to the third elevator 16, which transfers it to the lime storage bin 17. The quicklime from the lime storage bin 17 is then fed into the second feeding machine 18, which supplies a quantitative amount of quicklime to the nitrifying machine 19 within a specified time period. Adding water to the nitrifying machine 19 to react with the quicklime and form lime milk. Using a spiral slag extractor 20 to remove impurities from the lime milk. Then placing the purified lime milk in an intermediate tank. conveying the lime milk from the intermediate tank to the lime milk storage tank via the third transfer pump 21. Finally, transporting the lime milk from the storage tank to the second buffer tank 24 via the lime milk transfer pump 23.

The above description is merely a preferred embodiment of this disclosure, but the scope of protection of this disclosure is not limited to it. Any variations or substitutions that can be easily envisioned by those skilled in the art within the technical scope disclosed in this disclosure should be covered within the scope of protection of this disclosure.

What is claimed is:

1. A limestone slurry and lime milk preparing device for hydrometallurgy of laterite nickel ore, comprising a limestone slurry preparation assembly and a lime milk preparation assembly, wherein:

the limestone slurry preparation assembly comprises a first feeding machine, a grinding mill, a mixing machine, a first transfer pump, and a first buffer tank, which are connected in sequence; the first feeding machine is equipped with a first controller, the grinding mill is equipped with a second controller, the mixing machine is equipped with a third controller, the first transfer pump is equipped with a fourth controller, and the first buffer tank is equipped with a fifth controller; the fifth controller is simultaneously connected to the first controller, the second controller, the third controller, and the fourth controller; the fifth controller is capable of emitting a first sensing signal and transmitting it to the first controller, the second controller, the third controller, and the fourth controller when the weight of the limestone slurry in the first buffer tank is not within a first preset range; the first controller can adjust the feeding rate of the limestone raw material by the first feeding machine based on the first sensing signal; the second controller can control the grinding speed of the grinding mill in response to the first sensing signal; the third controller can regulate the mixing speed of the mixing machine according to the first sensing signal; the fourth controller can modify the pumping speed of the first transfer pump for conveying the limestone slurry based on the first sensing signal;

the lime milk preparation assembly comprises a lime kiln, a second conveyor, a third elevator, a lime storage bin, a second feeding machine, a nitrifying machine, a slag extractor, a third transfer pump, and a second buffer tank that are connected sequentially, the lime kiln is used for preparing quicklime, which is then conveyed to the second conveyor; the second feeding machine is equipped with a sixth controller, the nitrifying machine is equipped with a seventh controller, the third transfer pump is equipped with an eighth controller, and the second buffer tank is equipped with a ninth controller; the ninth controller is simultaneously connected to the sixth controller, the seventh controller, and the eighth controller; the ninth controller can send a second sensing signal when the weight of the lime milk in the second buffer tank is not within a second preset range, and transmit it to the sixth controller, the seventh controller, and the eighth controller simultaneously; the sixth controller can control the feeding rate of quicklime raw material from the second feeding machine based on the second sensing signal, the seventh controller can control the mixing rate of quicklime and water in the nitrifying machine based on the second sensing signal, and the eighth controller can control the transfer rate of lime milk by the third transfer pump based on the second sensing signal.

2. The limestone slurry and lime milk preparing device for hydrometallurgy of laterite nickel ore according to claim 1, wherein the first feeding machine comprises a first machine body and a first hopper that are slidingly connected; the first hopper is designed to slide up and down relative to the first machine body to convey limestone raw material into the grinding mill; the first hopper is connected to the first controller, which can adjust the speed of the first hopper's vertical movement relative to the first machine body based on the first sensing signal, thereby regulating the rate of limestone raw material supplied by the first feeding machine to the grinding mill.

3. The limestone slurry and lime milk preparing device for hydrometallurgy of laterite nickel ore according to claim 1, wherein the grinding mill comprises a grinding mill motor, a grinding disk, grinding rollers, a hydraulic pressing device, a pneumatic conveying channel, and a powder selecting machine; the number of the grinding rollers is 2-4; the grinding rollers are evenly arranged around the center of the grinding disk; the hydraulic pressing device is connected to the multiple grinding rollers, functioning to press the limestone material between the grinding disk and the grinding rollers; the grinding mill motor is connected to the grinding disk and can drive the grinding disk to rotate relative to the grinding rollers, thereby grinding the limestone material into limestone powder; the powder selecting machine and the limestone material are located at the air inlet and outlet of the pneumatic conveying channel, respectively; the pneumatic conveying channel is used to blow out the limestone powder, while the powder selecting machine allows limestone powder of a preset particle size to pass through.

4. The limestone slurry and lime milk preparing device for hydrometallurgy of laterite nickel ore according to claim 1, wherein the mixing machine comprises a third machine body, a mixing motor and a mixing rod installed in the third machine body; the mixing motor is connected to the mixing rod and can drive it to rotate, thereby mixing limestone powder and water; the mixing motor is connected to a third controller, which can control the rotational speed of the mixing motor based on the first sensing signal, thus adjusting the mixing speed of the mixing machine.

5. The limestone slurry and lime milk preparing device for hydrometallurgy of laterite nickel ore according to claim 1, wherein the limestone slurry preparation assembly also comprises a first conveyor and a first elevator; the first feeding machine, the first conveyor, the first elevator, and the grinding mill are connected in sequence; the first conveyor is used to transport the limestone supplied by the first feeding machine to the first elevator; the first elevator is used to transfer the limestone supplied by the first feeding machine to the grinding mill, enabling the grinding mill to grind the limestone into powder.

6. The limestone slurry and lime milk preparing device for hydrometallurgy of laterite nickel ore according to claim 1, wherein the second feeding machine comprises a fourth machine body and a second hopper that are slidingly connected; the second hopper is used to slide up and down relative to the fourth machine body in order to deliver quicklime raw material into the nitrifying machine; the second hopper is connected to a sixth controller, which can adjust the speed of the second hopper's vertical sliding motion relative to the fourth machine body based on the second sensing signal, thus regulating the rate of quicklime raw material supplied by the second feeding machine to the nitrifying machine.

7. The limestone slurry and lime milk preparing device for hydrometallurgy of laterite nickel ore according to claim 1, wherein the nitrifying machine comprises a fifth machine body, as well as a digestion motor and a digestion rod installed on the fifth machine body; the digestion motor is connected to the digestion rod and can drive it to rotate, thereby mixing quicklime and water; the digestion motor is connected to a seventh controller, which can control the rotational speed of the digestion motor based on the second sensing signal, thus adjusting the mixing speed of the quicklime and water within the nitrifying machine.

8. The limestone slurry and lime milk preparing device for hydrometallurgy of laterite nickel ore according to claim 1, wherein the limestone slurry preparation assembly further comprises a limestone powder storage tank and a rotor scale; the limestone powder storage tank is positioned between the second elevator and the rotor scale; the limestone powder storage tank is used to receive the limestone powder conveyed by the second elevator, while the rotor scale is used to weigh the contents of the limestone powder storage tank.

9. The limestone slurry and lime milk preparing device for hydrometallurgy of laterite nickel ore according to claim 1, wherein the lime milk preparation assembly also comprises a slag extractor positioned between the nitrifying machine and the third transfer pump; the slag extractor is used to extract impurities from the nitrifying machine.

10. The limestone slurry and lime milk preparing device for hydrometallurgy of laterite nickel ore according to claim 1, wherein the slag extractor is equipped with a tenth controller, which is connected to the ninth controller; the tenth controller can adjust the speed of impurity extraction by the slag extractor based on the second sensing signal.

11. The limestone slurry and lime milk preparing device for hydrometallurgy of laterite nickel ore according to claim 10, wherein the slag extractor consists of a connected slag extraction motor and propeller; part of the propeller is submerged in the solution contained within the nitrifying machine; when driven by the slag extraction motor, the propeller rotates to expel impurities from the solution; the slag extraction motor is connected to the tenth controller, which can regulate the rotational speed of the slag extraction motor based on the second sensing signal, thus adjusting the speed at which the propeller expels impurities.

\* \* \* \* \*